Sept. 22, 1970 G. RIOLLET 3,529,631
CURVED CHANNELS THROUGH WHICH A GAS OR VAPOUR FLOWS
Original Filed April 6, 1966 2 Sheets-Sheet 1

INVENTOR.
GILBERT RIOLLET

United States Patent Office 3,529,631
Patented Sept. 22, 1970

3,529,631
CURVED CHANNELS THROUGH WHICH A GAS OR VAPOUR FLOWS
Gilbert Riollet, 17 Rue du Moulin-de-Beurre, Paris, France
Continuation of application Ser. No. 540,680, Apr. 6, 1966. This application June 4, 1969, Ser. No. 833,871
Claims priority, application France, May 7, 1965, 16,264
Int. Cl. F15d 1/06
U.S. Cl. 138—39       4 Claims

ABSTRACT OF THE DISCLOSURE

Secondary flows in a curved channel of rectangular cross-section are reduced by deformations in the floor and ceiling surfaces of the channel changing the local fluid velocities and opposing the pressure gradient created by the curvature of the channel.

---

This application is a continuation of Ser. No. 540,680, filed Apr. 6, 1966.

This invention is for improvements in or relating to curved channels which are in cross-section substantially rectangular and through which a gas or vapour flows and which have two surfaces bounding the fluid flow path.

Channels of this kind are found, for instance, in the fixed and moving elements of a turbine or compressor. Such channels experience a phenomenon, in the form of side-slip of the boundary layers resulting in a secondary flow, which reduces efficiency.

It is an object of this invention to reduce and possibly to obviate the effect of such secondary flows and thus greatly increase the efficiency of an apparatus having such channels.

According to the invention, the channel surfaces perpendicular to the surfaces bounding the fluid flow path have deformations which modify the speed of the fluid in the regions in contact with the deformations, the same sense as the pressure modifications which would exist because of the surfaces bounding the fluid flow path in the absence of such deformation.

The invention will now be described in greater detail with reference to exemplary embodiments illustrated in the drawings wherein.

Figure 2:
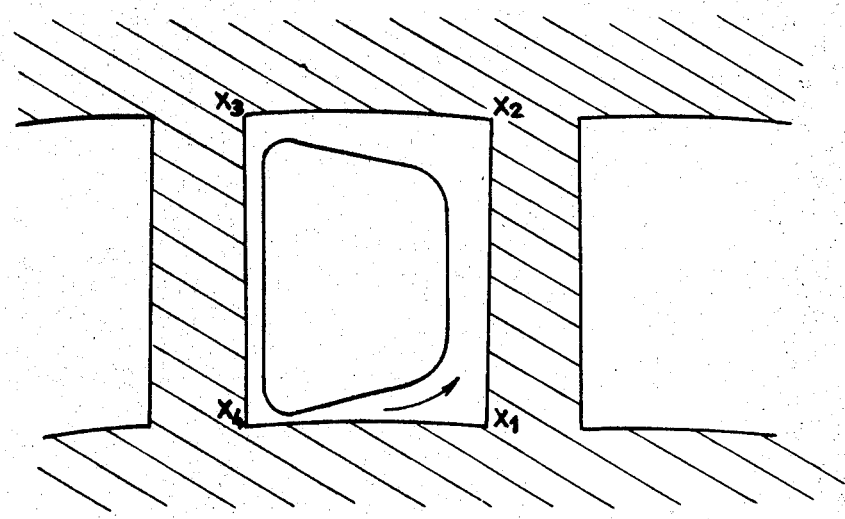
FIG. 2 is a section on the line II—II of FIG. 1.
Figure 1:
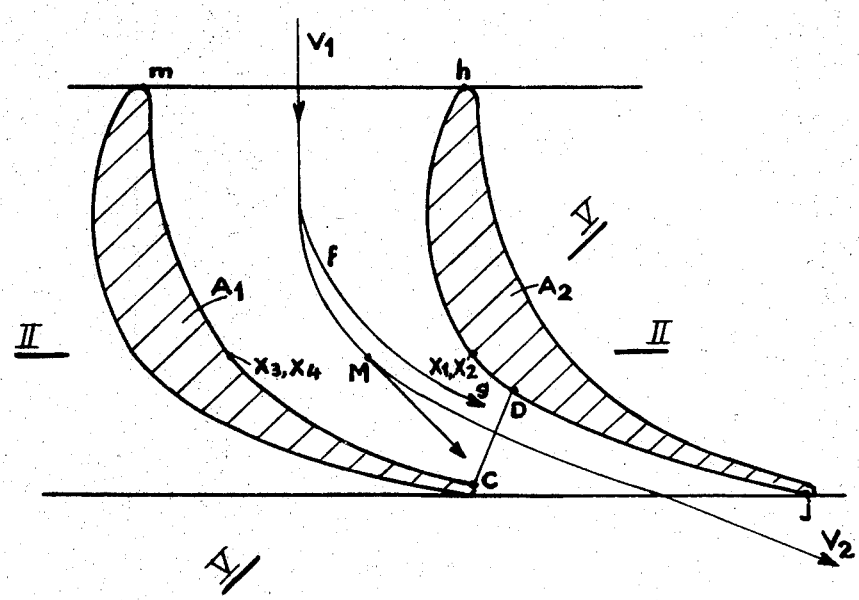
FIG. 1 is a section of a distributing channel of a turbine through a cylinder coaxial thereof.
Figure 3:
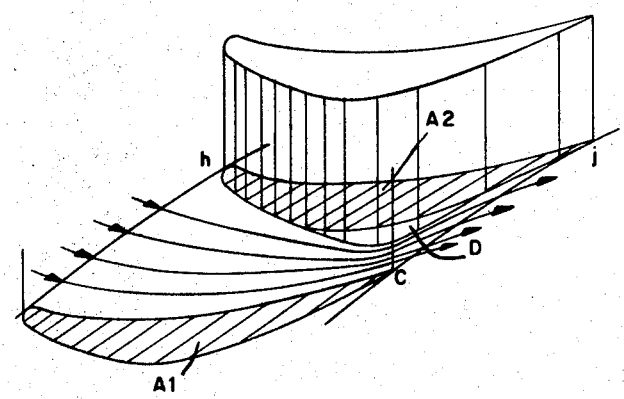
FIG. 3 is an isometric view along a blade of a portion of the distributor having the improvements according to the invention, the section taken near a blade $A_2$ on a line $hj$ with arrows showing the flow.

FIGS. 1 and 2 show a turbine distributing channel devoid of the improvements according to the invention. FIG. 1 shows that a channel is bounded by a concave surface of a blade $A_1$ and by the convex surface of a blade $A_2$. The cross-section of the channel, as taken on the line II—II of FIG. 1, is shown in FIG. 2 and takes the form of a substantially rectangular shape $X_1X_2X_3X_4$. The straight line $X_1X_2$ corresponds to the convex part of the blade $A_2$ and the straight line $X_3X_4$ corresponds to the concave part of the blade $A_1$. The channel also has two other surfaces forming a "floor" and a "ceiling," which are digrammatically represented in FIG. 2 by circle arcs $X_1X_4$ and $X_2X_3$. Upstream of the channel the fluid flows at a rate $V_1$, is deflected and accelerated as it passes through the channel, and leaves the same at a speed $V_2$ greater than the entry speed $V_1$; the fluid exit direction forms with the turbine axis an angle greater than the fluid entry direction.

Since the flow in the channel is accelerated, it would seem logical to think that the only losses experienced by the flow are friction against the walls, and since the walls are smooth the losses are bound to be slight. However, such is not the case, since boundary layers of some thickness are present along the channel walls and their trajectories behave very differently from the trajectory of the fluid particles in the central part of the channel. In FIG. 1, a fluid particle at a place M of a trajectory in the central part of the channel experiences a centrifugal force, and there can be equilibrium only if there is a transverse static pressure gradient to compensate for the centrifugal effect. Of course, the pressure rises as one moves from the convex part of the blade $A_2$ towards the concave part of the blade $A_1$. Consequently, the convex surface of the blade $A_2$ experiences a relative depression whereas the concave surface of the blade $A_1$ experiences a positive pressure.

The speed of a fluid particle, for instance, in the boundary layer of the surface $X_1X_4$ is lower than the speed of a particle at the place M in the central part of the channel. Consequently, the centrifugal effect, which varies with the square of the speed, is much less for a particle in the boundary layer than for a more central particle. But the pressure difference between the places D and C of the floor surface $X_1X_4$ on the blades $A_2$ and $A_1$ respectively is about the same as that in the control part of the channel and pushes the fluid particle towards the point D on the convex surface of the blade $A_2$. The path of a fluid particle near a boundary layer is therefore as indicated by the curve $fg$ in FIG. 1; indeed, the particle may even contact the blade $A_2$ and thicken the boundary layer along the wall of such blade, with the result of a secondary flow.

As in the case of the "floor" surface $X_1X_4$, secondary flow occurs in the case of the "ceiling" surface $X_2X_3$, and losses due to secondary flow are much greater than losses by friction against the walls.

The invention obviates this disadvantage and provides an increase in the static pressure in the zone D of the "floor" $X_1X_4$ and/or a decrease of the static pressure in the zone C of the floor. This action on the static pressure opposes the side-slip of the boundary layer and reduces losses very considerably. The same static pressure modifications can be made to the channel ceiling $X_2X_3$.

To act on the static pressure, for instance, to increase the same, the passage cross-section can be increased; the resulting speed reduction being accompanied by a rise in static pressure in accordance with Bernoulli's theorem. To product a positive pressure in the zone D, some of the material forming the floor in the zone D is removed near the blade $A_2$ so that the floor curves progressively downwards from the entry $h$, then rises to the exit $j$, passing through the zone D. The floor therefore has the form of a skew surface curving towards the axis of rotation transversely and longitudinally. The resulting hollow part is at a maximum near the exit cross-section C–D where the speeds of the main fluid flow, and therefore centrifugal effects are greatest. The floor rises progressively from D to $j$ so that the channel exit returns to a substantially rectangular shape.

Figure 4:
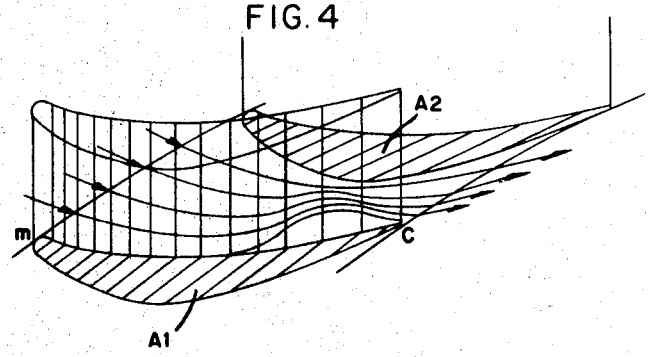
FIG. 4 is an isometric view similar to FIG. 3, the section being taken on a line $mc$ along a blade $A_1$ with arrows showing the flow.

Similarly, near the concave surface of the blade $A_1$ the floor is thickened (FIG. 4) to produce pressure reductions in the part where the fluid path would tend to produce a pressure rise. What has just been described for the floor $X_1X_4$ can be effected similarly for the ceiling $X_2X_3$, a hollow part being contrived in the zone where the fluid flow would tend to cause a pressure reduction and a convex part being contrived in the zone where there would be a pressure rise.

The same procedure can be used for the channels of a stationary element or of a moving element, the latter being, for instance, a turbine rotor; in this event, the static pressure modifications can be compensated for as described, with allowance for centrifugal forces which are absent in the case of a stationary channel.

Figure 5:
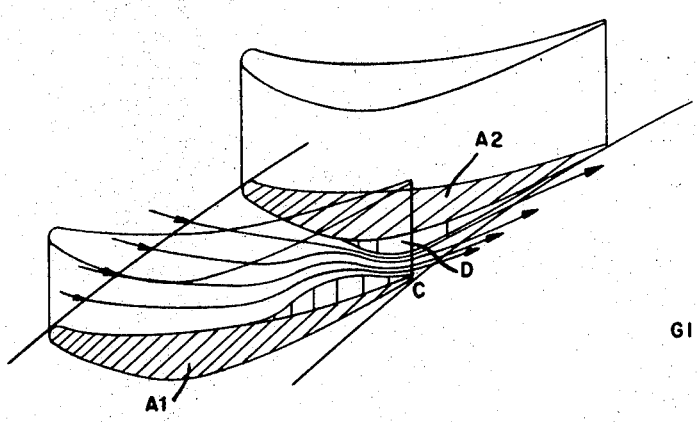
FIG. 5 is a section on the line V—V of FIG. 1, the channel having the structures of FIGS. 3 and 4.

FIG. 5 is a combination of the two types of improvements described above.

The invention is not of course limited by details of the embodiments hereinbefore described, and such details can be modified without departure from the scope of the invention.

What is claimed is:

1. Improvements in curved channels for improving the efficiency of three dimensional fluid flows having a substantially rectangular cross-section, opposite concave and convex blade surfaces for said channels, said flows being turned by said opposite concave and convex blade surfaces, floor and ceiling surfaces for said channels perpendicular to said blade surfaces and deformations in said floor and in said ceiling surfaces changing the local fluid velocity and opposing the pressure gradient normally created by the curvature of said channel.

2. Improvements as described in claim 1, said floor and said ceiling surfaces having a cavity adjacent said convex blade surface.

3. Improvements as described in claim 1, said floor and said ceiling surfaces having a swell adjacent said concave blade surface.

4. Improvements as described in claim 1, said floor and said ceiling surfaces having a cavity adjacent said convex blade surface and a swell adjacent said concave blade surface.

References Cited

UNITED STATES PATENTS

| | | | |
|---|---|---|---|
| 1,073,421 | 9/1913 | Josse et al. | |
| 1,315,232 | 9/1919 | Moody | 138—37 |
| 2,166,823 | 7/1939 | Rosenlocher. | |
| 2,382,913 | 8/1945 | Robinson. | |
| 2,590,797 | 3/1952 | Siciliano | 138—39 |
| 2,735,612 | 2/1956 | Hausmann. | |
| 2,870,958 | 1/1959 | Pinsley. | |
| 2,931,563 | 4/1960 | Eggleton. | |
| 2,974,927 | 3/1961 | Johnson. | |
| 3,000,401 | 9/1961 | Ringleb | 138—39 |
| 3,076,480 | 2/1963 | Vicard | 138—39 |

FOREIGN PATENTS

| | | |
|---|---|---|
| 485,797 | 10/1953 | Italy. |
| 730,009 | 5/1955 | Great Britain. |

LAVERNE D. GEIGER, Primary Examiner

H. K. ARTIS, Assistant Examiner

U.S. Cl. X.R.

230—122; 253—78